United States Patent [19]
Ernst

[11] Patent Number: 5,029,896
[45] Date of Patent: Jul. 9, 1991

[54] CLAMPING DEVICE FOR THE BELT BAND OF MOTOR VEHICLE SAFETY BELTS

[76] Inventor: Hans-Hellmut Ernst, Bismarckallee 50, D-2070 Ahrensburg, Fed. Rep. of Germany

[21] Appl. No.: 445,689
[22] PCT Filed: May 20, 1988
[86] PCT No.: PCT/DE88/00299
§ 371 Date: Jan. 19, 1990
§ 102(e) Date: Jan. 19, 1990
[87] PCT Pub. No.: WO88/09274
PCT Pub. Date: Dec. 1, 1988

[30] Foreign Application Priority Data
May 22, 1987 [DE] Fed. Rep. of Germany ....... 3717252

[51] Int. Cl.$^5$ ........................................... B60R 22/42
[52] U.S. Cl. .................................. 280/806; 297/479; 242/107.2
[58] Field of Search .................... 242/107.2; 297/464, 297/468, 476, 479, 483; 280/801–808

[56] References Cited
U.S. PATENT DOCUMENTS

| | | | |
|---|---|---|---|
| 4,371,126 | 2/1983 | Tsuge | 242/107.2 |
| 4,470,617 | 9/1984 | Yamada et al. | 280/806 |
| 4,624,422 | 11/1986 | Hollowell | 280/806 |
| 4,667,981 | 5/1987 | Koide | 280/806 |
| 4,682,791 | 7/1987 | Ernst | 280/806 |
| 4,691,875 | 9/1987 | Higbee | 280/806 |

FOREIGN PATENT DOCUMENTS

| | | |
|---|---|---|
| 0056894 | 6/1982 | European Pat. Off. . |
| 0185367 | 6/1986 | European Pat. Off. . |
| 8437581 | 10/1986 | Fed. Rep. of Germany . |
| 86-00585 | 1/1986 | PCT Int'l Appl. . |

Primary Examiner—Richard A. Bertsch
Attorney, Agent, or Firm—Peter K. Kontler

[57] ABSTRACT

A clamping device for the seat belt of a motor vehicle has a housing which is provided with a tapered passage bounded by mutually inclined first and second surfaces. The belt extends from a take-up reel, which automatically locks in response to high deceleration, into and through the passage adjacent to the first surface. A wedge-shaped clamping element is disposed in the housing between the belt and the second surface, and the side of the clamping element which faces the belt is provided with sawteeth. The clamping element is slidable along the second surface between a clamping position in which the toothed side thereof presses the belt against the first surface and a released position in which the clamping element is out of contact with the belt. The clamping element is connected with the take-up reel in such a manner that it moves from the released position to the clamping position in response to locking of the take-up reel. The first and second surfaces, the toothed side of the clamping element and the side of the clamping element adjacent to the second surface are all coated with an antifriction layer.

20 Claims, 2 Drawing Sheets

CLAMPING DEVICE FOR THE BELT BAND OF MOTOR VEHICLE SAFETY BELTS

BACKGROUND OF THE INVENTION

The invention relates to a clamping device for the belt band of motor vehicle safety belts, the device having at least two relatively adjustable clamping elements for engagement with the belt band.

Such clamping devices have various designs and are also incorporated in self-locking belt band take-up reels so that, upon locking of the same due to the so-called film spool effect, withdrawal of the remaining belt band length of up to 100 mm is prevented and, up to maximum load, a belt band withdrawal of only about 30 mm, for example is permitted.

The motor vehicle-sensitive, lockable belt band take-up reel in such a conventional construction is movable relative to the downstream clamping device and is spring-biased away from the same. The clamping device consists of a stationary clamping element and a movable clamping element, namely, of a housing through which the belt band from the take-up reel extends and a shiftable clamping wedge in the housing next to the belt band. Upon locking of the take-up reel, a resulting tension in the belt band causes it to shift towards the clamping device against the action of its spring load. Consequently, the clamping wedge is likewise shifted in the belt band withdrawal direction to clamp the belt band in the housing. The flat clamping surface of the clamping wedge which faces one side of the belt band and the flat clamping surface of the housing which faces the other side of the belt band are each provided with a coating of resilient material having a high coefficient of friction (West German publication no. 3 242 783).

This known construction is relatively large, heavy and expensive. A further drawback is that the take-up reel is locked and the clamping device activated whenever the motor vehicle deceleration exceeds 0.45 g thereby adversely affecting the belt band since it is roughened during each of the frequent resulting clamping actions of the clamping device by the highly frictional coatings of the same. This gives rise to the danger that the belt band will be so severely damaged after the required 20,000 clamping actions that its strength is no longer adequate and the comfort of the safety belt is affected. The coating on the clamping surface of the housing has a particularly harmful effect because the belt band moves mainly with reference to this coating during each clamping procedure. This relative motion, and thus undesired withdrawal of the belt band, increase with increasing flexibility of the clamping device so that, in addition to their high coefficients of friction, the resilient design of the coatings of the clamping device also has a harmful effect. Such design further brings with it the danger that the clamping device will not release after a clamping procedure, particularly when the clamping wedge has a relatively steep wedge angle. It is true that damage to the belt band can be counteracted by allowing the clamping device to become operative only at relatively high motor vehicle decelerations such as occur in an accident. However, belt band withdrawal can then not be held to a minimum.

In a similar conventional construction, the clamping wedge cooperates with a movable clamping wall, and the clamping wedge and clamping wall are applied against the belt band in tandem with the clamping wedge moving towards the clamping wall. The two clamping surfaces for the belt band on the clamping wedge and the clamping wall are each provided with transverse ribs which are arranged such that the clamping surfaces can interengage one another in a complementary fashion to deform and clamp the belt band extending between them in a serpentine manner (U.S. Pat. No. 3,504,867).

This known construction is also relatively large, heavy and expensive. Another drawback is that the clamping wedge as well as the clamping wall have a relatively large mass and the transverse ribs of their belt band clamping surfaces are separated by a relatively large gap so that a correspondingly large mutual displacement is required for clamping of the belt band. Such displacement is retarded due to the inertia of the clamping wedge and the clamping wall so that it takes a relatively long time for the clamping wedge and the clamping wall to arrive at the clamping position with an unavoidable, correspondingly large belt band withdrawal. The belt band, which travels by the aggressive transverse ribs during this period, is very much affected by the transverse ribs as it is by the serpentine clamping which likewise has a negative effect on the strength of the belt band and the comfort of the safety belt. Thus, this construction, also, is suited for clamping of the belt band only once in an accident situation and with an accompanying large belt band withdrawal.

The European Patent Application No. 0 185 367 discloses a clamping device which includes a rigid clamping part having a relatively firm reaction surface with a low coefficient of friction and which thus clamps the belt band sufficiently gently on the corresponding side. A movable clamping element provided with gripping teeth grips the belt band on the opposite side. This is to occur synchronously, that is, with a speed of approach to the belt band which is equal to the speed of withdrawal of the belt.

In practice, however, uncontrollable effects due to the surroundings cannot be eliminated (belt band elongation, jerking upon belt withdrawal, manufacturing tolerances). Accordingly, on a microscopic level, relative movement of the belt band and the gripping teeth, which has an adverse effect on the belt band over time, occurs during penetration of the gripping teeth into the belt band and also upon removal.

The friction between the movable clamping element (clamping jaw) and the clamping lever is of great importance in achieving unblocking (release of the belt band after clamping) without problems. Only when relative movement can take place there under the existing clamping pressure is the return spring able to push back the clamping lever and the clamping part into the rest position.

OBJECT OF THE INVENTION

It is an object of the invention to provide a clamping device of the type set forth at the outset which, in a simple manner, assures a gentle yet reliable calmping of the belt band with little belt band withdrawal, and thereby also makes frequent clamping procedures possible without detrimental effects on the belt band, and which, in addition, releases reliability and frees the belt band after each clamping procedure.

SUMMARY OF THE INVENTION

This object is achieved by the features set forth in the characteristic part of claim 1. Advantageous embodiments of the clamping device of the invention are presented in the remaining claims.

In the clamping device according to the invention, at least all those locations of each clamping element which come into contact with the associated belt band during a clamping procedure are coated with an antifriction layer. Due to its extraordinarily low coefficient of friction relative to the belt band, this layer assures the greatest possible protection for the latter when the clamping elements grip the belt band, as well as reliable release of the clamping elements from the belt band after a clamping procedure.

It is preferred for the movable clamping element, or each movable clamping element, to be adjustable by sliding and for the corresponding sliding surfaces to be coated with an antifriction layer also. This allows protection of the belt band and release of the clamping device to be further improved.

The antifriction layer at the belt band contact locations and, if applicable, at the sliding surfaces of the clamping elements is advantageously hard and thin, e.g., has a thickness of about 0.1 mm. The clamping elements are preferably rigid, rigidly supported and arranged so that they come into contact with the belt band after a small relative displacement. It is of advantage for the movable clamping element, or each movable clamping element, to have a small mass and, to this end, it can consist of an aluminum alloy or a hard synthetic resin such as, for example, a duromer, which is also of benefit for the mentioned rigidity.

These measures are advantageous as regards an extremely rapid clamping of the belt band, and this is associated not only with an extraordinarily small belt band withdrawal during the clamping procedure but also with increased protection of the belt band during the clamping procedure due to the correspondingly small relative displacement of the belt band and clamping elements These measures are further of advantage with respect to the subsequent release of the clamping device Maximum rigidity of the clamping device combined with minimum spacings between its clamping elements and the associated belt band results in clamping of the belt band upon a small displacement of the movable clamping element, or of each movable clamping element, and such displacement occurs with virtually no delay when the clamping device has little inertia. The rigidity of the clamping device, in particular, including the incompressibility of the antifriction layer, also has a favorable effect as regards release after a clamping procedure.

The clamping device in accordance with the invention is especially suitable for use with a self-locking belt band take-up reel in order to clamp its belt band, particularly a belt band take-up reel which is motor vehicle-sensitive and locks at motor vehicle decelerations in excess of 0.45g, for example. Here, the movable clamping element, or each movable clamping element, of the clamping device is connected with the upstream belt band take-up reel so that it is displaced upon locking of the latter and all clamping elements of the clamping device come into engagement with the belt band extending away from the take-up reel. The arrangement is preferably such that the movable clamping element, or each movable clamping element, is displaceable together with the belt band which moves away from the take-up reel but more rapidly than the same. To this end, an appropriate gear mechanism can be provided between the belt band take-up reel or its motor vehicle deceleration sensor and the clamping element. This more rapid movement of the clamping element during a clamping procedure so that the belt band is overtaken by the movable clamping element or elements has a particularly protective effect on the belt band when the clamping element or elements engage the belt band with a toothed clamping surface and allows an even smaller belt band withdrawal during the clamping procedure to be achieved. Especially good protection for the belt band is obtained when the clamping surface for the belt band is sawtooth-like with the teeth being steeped in the direction of belt band withdrawal and less steep in the opposite direction.

The clamping device according to the invention preferably has a movable clamping element and a stationary clamping element which are disposed on opposite sides of the associated belt band. The movable clamping element is formed by a clamping wedge which is shiftable in a housing along a sliding surface of the same and has a sliding surface in contact with the sliding surface of the housing as well as a toothed clamping surface for the belt band. The stationary clamping element is formed by a clamping wall of the housing.

It is of advantage for the two sliding surfaces of the housing and the clamping wedge to be flat with the sliding surface of the housing and the belt band enclosing an angle in the range of 22° to 28°, preferably an angle of 25°. This makes it possible to achieve a very small displacement of the clamping wedge between the released position and the clamping position.

The clamping wedge preferably has a wedge angle larger than the angle between the sliding surface of the housing supporting the same and the belt band extending through the housing, for example, a wedge angle of 25.5° when the sliding surface angle is 25°. When the clamping wedge and the clamping wall of the housing lie against the belt band, there then exists a clamping gap between the clamping wedge and the clamping wall of the housing which increases in width towards the tip of the clamping wedge. Such a V-shaped clamping gap is advantageous for the introduction of clamping pressure into the clamped belt band and increases its load capacity. The same effect can be achieved by making the two sliding surfaces of the housing and the clamping wedge correspondingly convex and concave in the direction of movement of the latter.

The belt band clamping surface of the clamping wedge is preferably provided with sawteeth arranged so that the sides thereof which cace the base of the clamping wedge are perpendicular to the neighboring belt band and thus steeper than the sides of the sawteeth which face the tip of the clamping wedge.

It is similarly preferred to provide the clamping surface of the clamping wedge with conical teeth, and such teeth can function as sawteeth when each is designed as an inclined cone arranged so that the generatrix thereof which faces the base of the clamping wedge is perpendicular to the neighboring belt band. The conical teeth can have a base diameter of about 1.5 times the tooth height which can, for example, be 0.5 mm.

The teeth of the clamping surface of the clamping wedge are advantageously arranged in rows which extend transverse to the neighboring belt band and are offset relative to one another so that each group of four neighboring teeth lie at the corners of a square whose sides have a length of 2 to 2.5 times the tooth height of, for instance, 0.5 mm. This tooth distribution is especially favorable for sawteeth which are respectively formed as inclined cones.

The provision of the belt band clamping surface of the clamping wedge with teeth assures reliable clamping of the belt band without appeciable slip or corresponding losses as regards belt band withdrawal in spite of the coating of the belt band clamping surface with an antifriction layer. In particular, sawteeth which are distributed in the manner outlined and are respectively designed as inclined cones allow a reliable complementary lock to be established between the tips of the cones and the belt band during a clamping procedure without roughening the latter or reducing its load capacity even after many clamping procedures. As already mentioned, a very small tooth height, e.g., only 0.5mm, can be used and is advantageous for a rapid clamping action.

To achieve a small displacement of the clamping wedge which clamps the neighboring belt band in the housing between the clamping wall thereof and the clamping wedge itself, it is further of advantage for the clamping surface teeth of the clamping wedge to have a total volume approximating 80% of the total volume of the free spaces which are present in the fabric of the belt band in the area of the clamping surface. This has the result that, after penetration of the teeth, virtually no air remains in the portion of a belt band clamped during a clamping procedure and that the belt band portion retains minimal compressibility, if any.

It is preferred to provide guides for the belt band so that it extends adjacent to the belt band clamping surface on the clamping wall of the housing. The latter is advantageously situated in a U-shaped supporting plate, and the clamping wall of the housing has protuberances on the side thereof facing away from the belt band clamping surface and projecting into corresponding openings in the base of the supporting plate. A transverse bar extends through the housing on the side of the clamping wedge facing away from the clamping wall and projects into corresponding openings in the legs of the support plate.

It is of advantage for the movable clamping element, or each movable clamping element, or the clamping wedge of the clamping device according to the invention to be adjustable against the action of a return spring.

BRIEF DESCRIPTION OF THE DRAWINGS

Two embodiments of the clamping device of the invention are described below by way of example with reference to drawings. There is shown.

DESCRIPTION OF PREFERRED EMBODIMENTS

Figure 1:
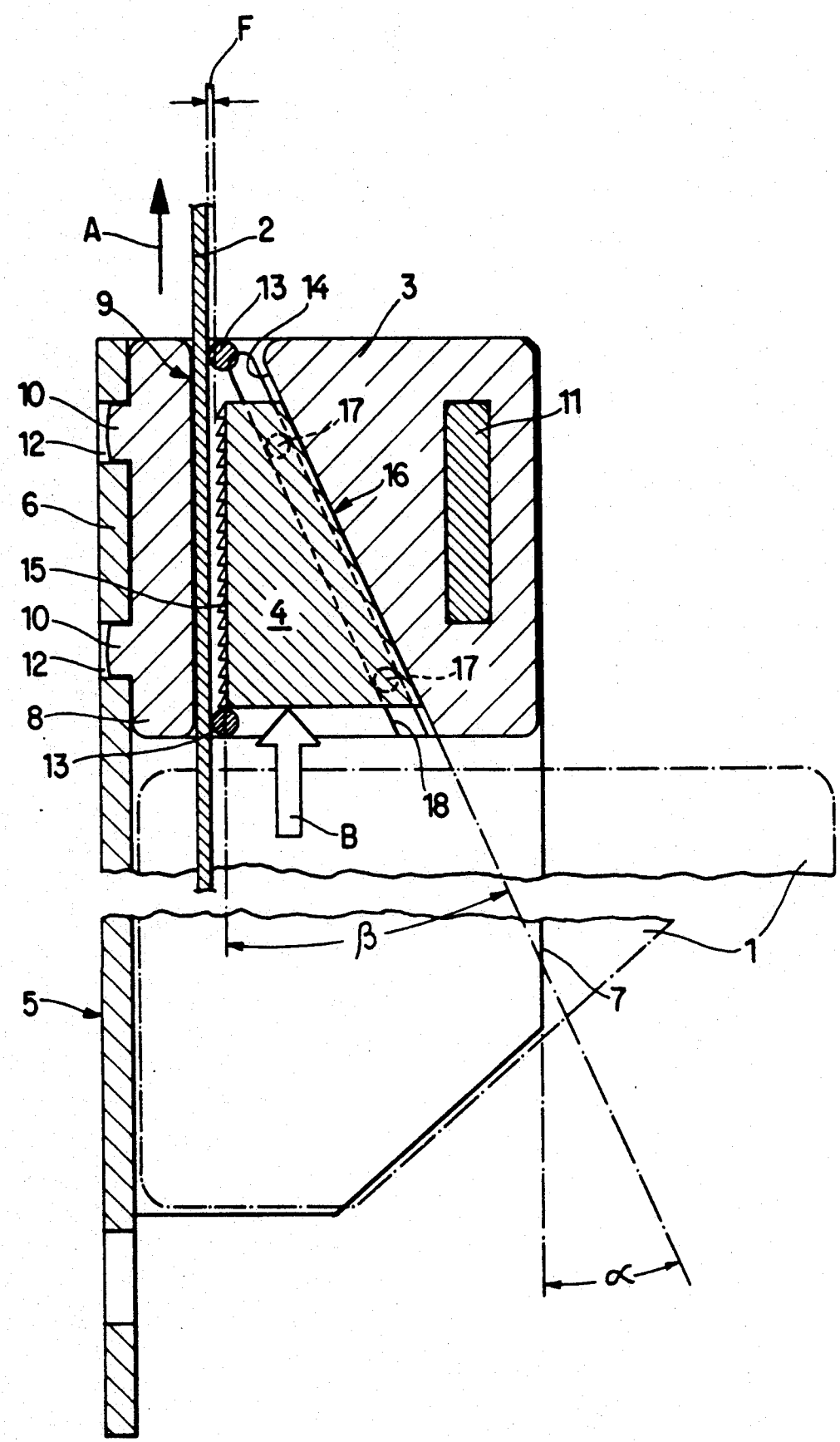
FIG. 1 a longitudinal section through a first embodiment.

The clamping device of FIG. 1 is combined in a module with belt band take-up reel 1 shown in dash-and-dot lines in order to clamp a belt band 2 which can unwind from the take-up reel 1 in the direction of the arrow A when the upstream, motor vehicle-sensitive take-up reel 1 locks, e.g., in response to a motor vehicle deceleration of 0.45 g. The belt band take-up reel 1 need not assume any appreciable loads and can therefore be manufactured economically as a lightweight structure of synthetic resin. The belt band take-up reel 1 and the clamping device, which includes a housing 3 and a clamping wedge 4, are arranged on a common, U-shaped supporting plate 5 having a base 6 and two legs 7.

The housing 3 has a clamping wall 8 with a flat clamping surface 9 for the belt band 2. The housing 3 is secured to the supporting plate 5 by means of protuberances 10 on the side of the clamping wall 8 facing away from the clamping surface 9 and by means of a transverse bar 11 which extends through the housing 3 on the side of the clamping wedge 4 facing away from the clamping wall 8. The protuberances 10 project into corresponding openings 12 in the base 6 of the supporting plate 5 while the two ends of the transverse bar 11 protruding from the housing 3 project into corresponding openings in the legs 7 of the supporting plate 5. The belt band 2 extends along the clamping surface 9 and is conducted proximate to the same via guides 13.

The clamping wedge 4 is shiftable in the direction of the arrow B from the released position of FIG. 1 to the clamping position so that a clamping surface 15 on the side thereof facing the belt band 2 comes into engagement with the latter. The clamping wedge 4 is shiftable from the released position to the clamping position along a flat sliding surface 14 of the housing 3 against the action of a return spring. It lies against the sliding surface 14 of the housing 3 with its own sliding surface 16, is rigid and has a small mass. To this end, it advantageously consists of an aluminum alloy or a hard synthetic resin, especially a duromer.

The sliding surface 14 of the housing 3 can enclose an angle alpha in the range of 22° to 28° with the belt band 2. The sliding surface angle alpha in the illustrated case is 25°. In the clamping position of the clamping wedge 4, the latter as well as the clamping wall 8 of the housing 3 engage the belt band 2. In order that a clamping gap which increases in width towards the tip of the clamping wedge 4, and thus has the shape of an upwardly open V in FIG. 1, may exist between the clamping wedge 4 and the clamping wall 8 of the housing 3 in the clamping position of the clamping wedge 4, the wedge angle beta of the clamping wedge 4 is larger than the sliding surface angle alpha. The wedge angle beta in the illustrated case is 25.5°.

The two sides of the clamping wedge 4 next to the legs 7 of the supporting plate 5 are guided by means of sliding pegs 17. The sliding pegs 17 project with clearance into two sliding grooves 18 which are provided in the housing 3 on either side of the clamping wedge 4 and extend parallel to the housing sliding surface 14 for the clamping wedge 4. The clamping surface 15 of the latter for the belt band 2 is provided with sawteeth which are steeper in the belt band withdrawal direction A and less steep in the opposite direction and have a tooth height t of only 0.5 mm. In the released position of the clamping wedge 4 shown in FIG. 1, only a narrow free gap F having a width of 0.5 mm is present between the sawteeth and the neighboring belt band 2.

With this small tooth height t, small width of the free gap F and relatively large sliding surface angle alpha, the clamping wedge 4 need travel a distance of only 2.5 mm in the direction of the arrow B to arrive in the clamping position at full load from the released position of FIG. 1. After a displacement of 2.15 mm, it has shifted 1 mm to the left in FIG. 1 so that the free gap width of 0.5 mm and the height t of the teeth of its clamping surface 15, which is likewise 0.5 mm, have been accounted for. The clamping wedge 4 now establishes a complementary lock with the belt band 2 which, on the opposite side, lies against the clamping surface 9 of the housing clamping wall 8. It then shifts another 0.35mm in the direction of the arrow B due to compression of the belt band 2 by the clamping pressure. To reliably limit the clamping wedge 4 to the extremely small displacement of only 2.5 mm and assure a correspondingly small belt band withdrawal in the direction of the arrow A during a clamping procedure, the clamping wedge 4 and the housing 3 are rigid. The housing 3 is further reinforced by the supporting plate 5 in that it is braced against the base 6 of the latter, on the one hand, and is connected with the legs 7 thereof by the transverse bar 11, on the other hand. The hard and inelastic structure of the clamping wedge 4 and the housing 3 rules out any increase in clamping wedge displacement due to elastic deformation.

The lightweight structure of the clamping wedge 4 has a positive effect with respect to achieving a rapid clamping action. By virtue of its small inertia, the clamping wedge 4 can move with practically no delay and can instantaneously and without lag travel along with the belt band 2 in the direction of the arrow B eve when belt band withdrawal is jerky. Accordingly, no relative motion, which results in belt band damage, occurs between the belt band 2 and the teeth of the clamping suface 15 of the clamping wedge 4 which are agressive in such direction. Undesired belt band withdrawal remains very small.

Movement of the clamping wedge 4 in the direction of the arrow B from the released position of FIG. 1 to the clamping position occurs when the belt band take-up reel 1 locks. To this end, the clamping wedge 4 is connected to the belt band take-up reel 1 or its motor vehicle deceleration sensor via a drive rod or the like. To improve the clamping action, this connection can be made by way of a gear mechanism so that, during a clamping procedure, the clamping wedge 4 moves in the direction of the arrow B more rapidly than the belt band 2 moves in the direction of the arrow A and, so to speak, overtakes it. Although this is associated with relative movement of the clamping wedge 4 and the belt band 2, the direction of such relative movement is that in which the sawteeth of the clamping surface 15 of the clamping wedge 4 are not aggressive. In this manner, still smaller belt band withdrawals can be achieved during the clamping procedures.

At least the contact locations of the housing 3 and the clamping wedge 4 with the belt band 2, namely, the clamping surface 9 of the clamping wall 8 and the clamping surface 15, and the two cooperating sliding surfaces 14, 16 are respectively coated with a thin and hard antifriction layer having a thickness of approximately 0.1mm. The antifriction layers produce and extremely low coefficient of friction with reference to the belt band 2, as well as at the sliding surfaces 14 and 16, and are completely incompressible so that the rigidity of the housing 3 and the clamping wedge 4 is not affected. The antifriction layers on the two clamping surfaces 9,15 assure an extraordinarily gentle interaction with the belt band 2 upon clamping of the same while the antifriction layers on the two sliding surfaces 14,16 assure an extraordinarily easy adjustability of the clamping wedge 4 in the housing 3.

Figure 2:
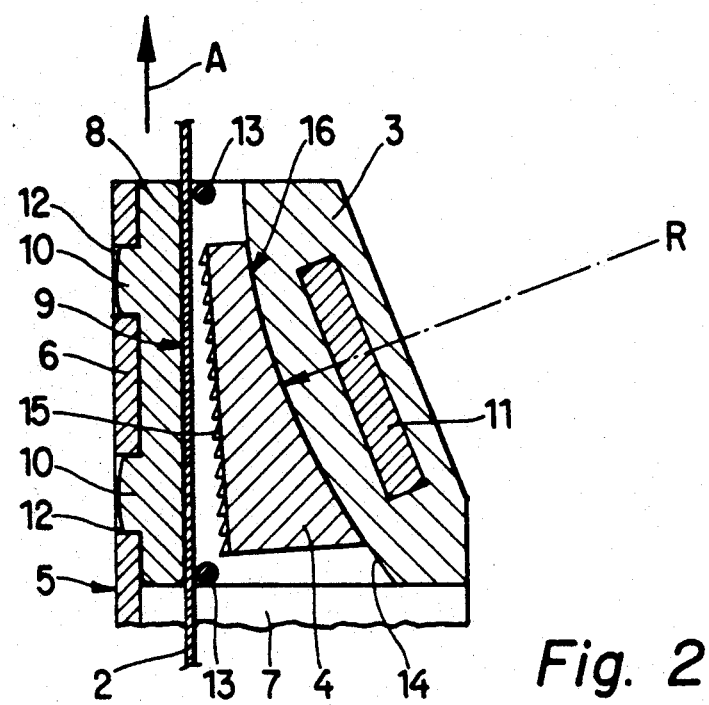
FIG. 2 a longitudinal section through a second embodiment.

The clamping device according to FIG. 2 differs from that of FIG. 1 essentially only in that the sliding surface 14 of the housing 3 is convex in the direction of movement of the clamping wedge 4 and the sliding surface 16 of the latter has a correspondingly concave arch. The radius of curvature R is relatively large, and larger than illustrated, in order to produce the mentioned clamping gap which is to exist between the clamping wedge 4 and the clamping wall 8 of the housing 3, or between the clamping surfaces 9,15 thereof, in the clamping position of the clamping wedge 4 and increases in with towards the tip of the clamping wedge 4.

Figure 3A:
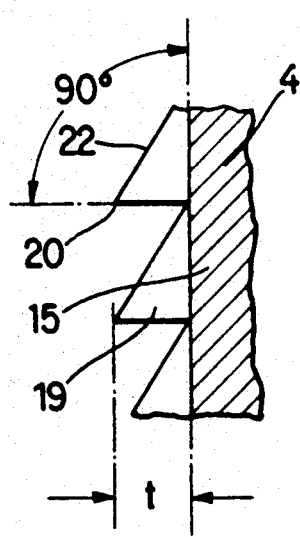
FIG. 3a the teeth of the clamping surface of the clamping wedge according to FIGS. 1 and 2 on an enlarged scale.
Figure 3B:
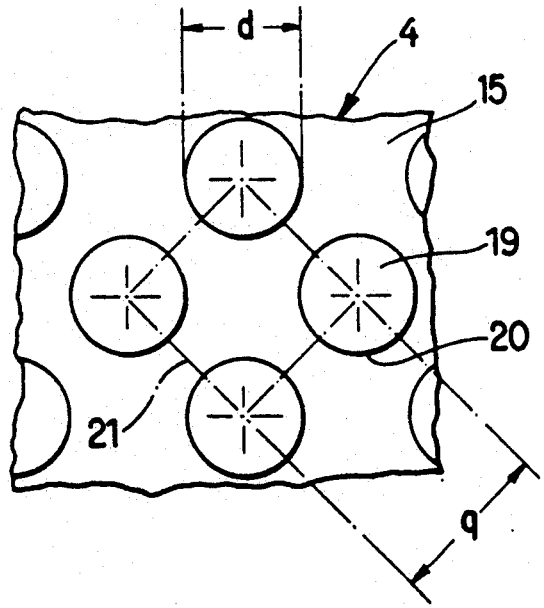
FIG. 3b a view of the teeth of FIG. 3a from the left.

The sawteeth of the clamping surface 15 of the clamping wedge 4 are particularly clear in FIGS. 3a and 3b. Here, the clamping surface 15 is provided with sawteeth 19 and the sides 20 of the latter facing the base of the clamping wedge 4 are perpendicular to the neighboring belt band 2 which is not shown in FIGS. 3a and 3b. Each of the sawteeth 19 is constructed as an inclined cone and has the mentioned height t of 0.5 mm as well as a base diameter d which is about 1.5 times the tooth height t. The sawteeth 19 are arranged in rows which extend transverse to the belt band 2 and are offset relative to one another so that each group of four neighboring sawteeth 19 lie at the corners of a square 21 whose sides have a length q which is 2 to 2.5 times the tooth height t. If the clamping surface 15 of the clamping wedge 4 has a width of 50 mm and a height of 30 mm, approximately 1,000 sawteeth 19 can be applied to the same when the length q of the sides of the square 21 is 1 mm. The specific load on the belt band 2 during clamping is then so small that frequent repeat loading and high terminal loading are possible.

The sawteeth 19, which are respectively constructed as inclined cones, have sides 22 which face the tip of the clamping wedge 4. The sides 20 of the sawteeth 19, which face the base of the clamping wedge 4 and are respectively constituted by that generatrix of the associated inclined cone facing the base of the clamping wedge 4, are steeper than the sides 22. The sawteeth 19 have a total volume which approximates 80% of the total volume of the free spaces which are present in the fabric of the belt band 2 in the area of the clamping surface 15. Thus, a corresponding quantity of air is forced out of the free spaces of the belt band 2 during a clamping procedure and the clamping procedure proceeds more inelastically.

I claim:

1. Clamping device for the belt bands of motor vehicle safety belts, the device having a clamping element at each side of the belt band and each of said elements being engageable with the belt band, at least one of said clamping elements being movable and teh other of said calmping elements having a smooth reaction surface with a low coefficient of friction, the movable clamping element (4) having a toothed portion (15) adjacent the belt band (2) and coated with an antifriction layer.

2. Clamping device according to claim 1, characterized in that said movable clamping element (4) is adjustable by sliding and has sliding surfaces (14,16) coated with an antifriction layer.

3. Clamping device according to claim 1, characterized in that the antifriction layer is thin and hard.

4. Clamping device according to claim 1, characterized in that the clamping elements (4,8) are rigid, rigidly supported and come into engagement with the belt band (2) after only a small relative displacement.

5. Clamping device according to claim 1, characterized in that each movable clamping element (4), has a small mass.

6. Clamping device according to claim 5, characterized in that the movable clamping element (4), clamping element (4), consists of an aluminum alloy or a hard synthetic resin.

7. Clamping device according to claim 1 characterized in that the movable clamping element (4), or each movable clamping element (4), is connected with an upstream, selflocking belt band take-up reel (1) so that it is displaced upon locking of the latter.

8. Clamping device according to claim 7, characterized in that the movable clamping element (4), is displaceable together with, but more rapidly than, the belt band (2) travelling away from the take-up reel (1).

9. Clamping device according to claim 1 characterized in that the movable clamping element (4), is displaceable against the action of a return spring.

10. Clamping device according to claim 1 characterized in that the movable clamping element is constituted by a clamping wedge (4) which is shiftable in a housing (3) along a sliding surface (14) of the same and has a sliding surface (16) in contact with the sliding surface (14) of the housing (3) said other clamping element being constituted by a clamping wall (8) of the housing (3).

11. Clamping device according to claim 10, characterized in that the two sliding surfaces (14,16) of the housing (3) and the clamping wedge (4) are flat, and the sliding surface (14) of the housing (3) encloses an angle (alpha) in the range of 22° to 28°, preferably an angle (alpha) of 25°, with the belt band (2).

12. Clamping device according to claim 11, characterized in that the clamping wedge (4) has a wedge angle (beta) larger than the sliding surface angle (alpha) so that a clamping gap which increases in width towards the tip of the clamping wedge (4) is present between the clamping wedge (4) and the clamping wall (8) of the housing (3) when they engage the belt band (2).

13. Clamping device according to claim 10, characterized in that the two sliding surfaces (14,16) of the housing (3) and the clamping wedge (4) have respective convex and concave curvatures in the direction of movement of the latter such that a clamping gap which increases in width towards the tip of the clamping wedge (4) is present between the clamping wedge (4) and the clamping wall (8) of the housing (3) when they engage the belt band (2).

14. Clamping device according to claim 10, characterized in that the clamping surface (15) of the clamping wedge (4) is provided with sawteeth (19) and the sides (20) of the latter facing the base of the clamping wedge (4) are perpendicular to the belt band (2).

15. Clamping device according to claim 10, characterized in that the clamping surface (15) of the clamping wedge (4) is provided with conical teeth (19).

16. Clamping device according to claim 15, characterized in that the teeth (19) have a base diameter (d) which is approximately 1.5 times the tooth height (t).

17. Clamping device according to claim 10, characterized in that the teeth (19) of the clamping surface (15) of the clamping wedge (4) are arranged in rows which extend transverse to the belt band (2) and are offset relative to one another so that each group of four neighboring teeth (19) lie at the corners of a square (21) whose sides have a length (q) 2 to 2.5 times the tooth height (t).

18. Clamping device according to claim 10, characterized in that the teeth (19) of the clamping surface (15) of the clamping wedge (4) have a total volume which approximates 80% of the total volume of the free spaces which are present in the fabric of the belt band (2) in the area of the clamping surface (15).

19. Clamping device according to claim 10, characterized by guides (13) for the belt band (2) so that it extends close to the clamping surface (9) which is provided for the belt band (2) on the clamping wall (8) of the housing (3).

20. Clamping device according to claim 10, characterized in that the housing (3) is arranged in a U-shaped supporting plate (5), the clamping wall (8) of the housing (3) having protuberances (10) on the side thereof facing away from its clamping surface (9) for the belt band (2) and projecting into corresponding openings (12) in the base (6) of the supporting plate (5), and a transverse bar (11) which extends through the housing (3) on the side of the clamping wedge (4) facing away from the clamping wall (8) projecting into corresponding openings in the legs (7) of the supporting plate (5).

* * * * *